United States Patent
Martinez et al.

(10) Patent No.: US 8,165,137 B2
(45) Date of Patent: Apr. 24, 2012

(54) FAST DATABASE MIGRATION

(75) Inventors: Robert Martinez, Frisco, TX (US);
Fwu-Meei Ting, Carrollton, TX (US);
Zack Guthrie, Plano, TX (US);
Chien-Wen Tien, Plano, TX (US)

(73) Assignee: Alcatel Lucent, Paris (FR)

( * ) Notice: Subject to any disclaimer, the term of this patent is extended or adjusted under 35 U.S.C. 154(b) by 479 days.

(21) Appl. No.: 11/363,223

(22) Filed: Feb. 27, 2006

(65) Prior Publication Data
US 2007/0201470 A1 Aug. 30, 2007

(51) Int. Cl.
*H04L 12/28* (2006.01)

(52) U.S. Cl. ............................................................ 370/401

(58) Field of Classification Search .................. 455/433; 707/201, 202, 205
See application file for complete search history.

(56) References Cited

U.S. PATENT DOCUMENTS

| | | | | |
|---|---|---|---|---|
| 5,764,920 | A * | 6/1998 | Cook et al. | 709/238 |
| 6,098,076 | A | 8/2000 | Rekieta et al. | |
| H1859 | H * | 9/2000 | Asthana et al. | 370/217 |
| 6,115,463 | A * | 9/2000 | Coulombe et al. | 379/230 |
| 6,182,087 | B1 * | 1/2001 | Lim | 707/204 |
| 6,223,035 | B1 * | 4/2001 | Pierce et al. | 455/433 |
| 6,259,909 | B1 * | 7/2001 | Ratayczak et al. | 455/411 |
| 6,282,280 | B1 * | 8/2001 | Rekieta et al. | 379/230 |
| 6,729,929 | B1 * | 5/2004 | Sayers et al. | 455/446 |
| 6,993,577 | B2 * | 1/2006 | Shavit et al. | 709/223 |
| 7,013,139 | B1 * | 3/2006 | Gan et al. | 455/432.3 |
| 7,085,554 | B2 * | 8/2006 | Picard et al. | 455/413 |
| 7,124,143 | B2 * | 10/2006 | Matsunami et al. | 707/101 |
| 7,171,199 | B1 * | 1/2007 | Rahman | 455/433 |
| 2002/0032853 | A1 * | 3/2002 | Preston et al. | 713/151 |
| 2002/0078167 | A1 * | 6/2002 | Shavit et al. | 709/217 |
| 2002/0161784 | A1 * | 10/2002 | Tarenskeen | 707/200 |
| 2003/0069903 | A1 * | 4/2003 | Gupta et al. | 707/204 |
| 2003/0130980 | A1 * | 7/2003 | Bell et al. | 707/1 |
| 2003/0182525 | A1 * | 9/2003 | O'Connell et al. | 711/162 |
| 2005/0020259 | A1 * | 1/2005 | Herrero | 455/433 |
| 2005/0041644 | A1 * | 2/2005 | Noguchi et al. | 370/352 |
| 2005/0083862 | A1 * | 4/2005 | Kongalath | 370/299 |
| 2005/0286466 | A1 * | 12/2005 | Tagg et al. | 370/329 |
| 2006/0020663 | A1 * | 1/2006 | Matsunami et al. | 709/203 |
| 2006/0246894 | A1 * | 11/2006 | Meng | 455/433 |
| 2007/0106710 | A1 * | 5/2007 | Haustein et al. | 707/204 |
| 2007/0202884 | A1 * | 8/2007 | Nykanen et al. | 455/455 |

FOREIGN PATENT DOCUMENTS

WO WO9851095 11/1998

* cited by examiner

*Primary Examiner* — Chirag Shah
*Assistant Examiner* — Jenkey Van
(74) *Attorney, Agent, or Firm* — RG and Associates LLC

(57) ABSTRACT

A system, method, and computer readable medium for fast database migration, that comprises, establishing a socket connection directly between intelligent processor unit nodes of the originating system and the terminating system, transferring home location register static data for the subscriber via the socket connection, wherein the home location register static data is transferred in parallel between intelligent processor unit nodes of the originating system and the terminating system and bypassing the platform manager nodes of the originating system and the terminating system and synchronizing home location register transient data between intelligent processor unit nodes of the originating system and the terminating system.

13 Claims, 3 Drawing Sheets

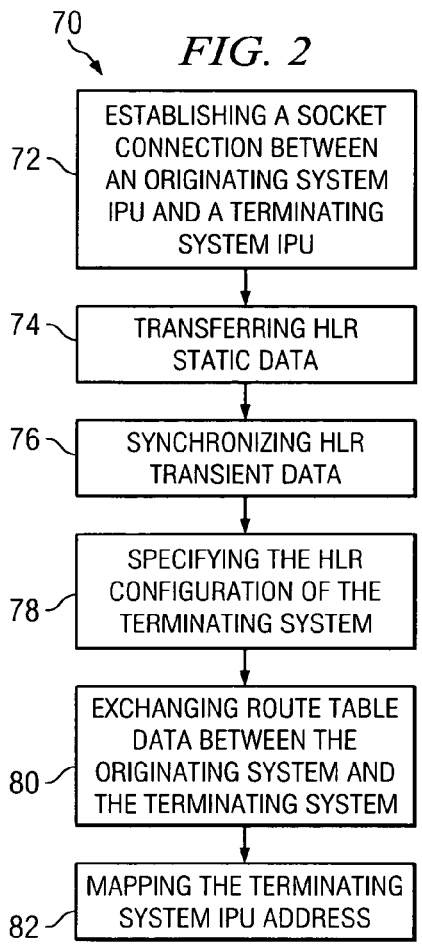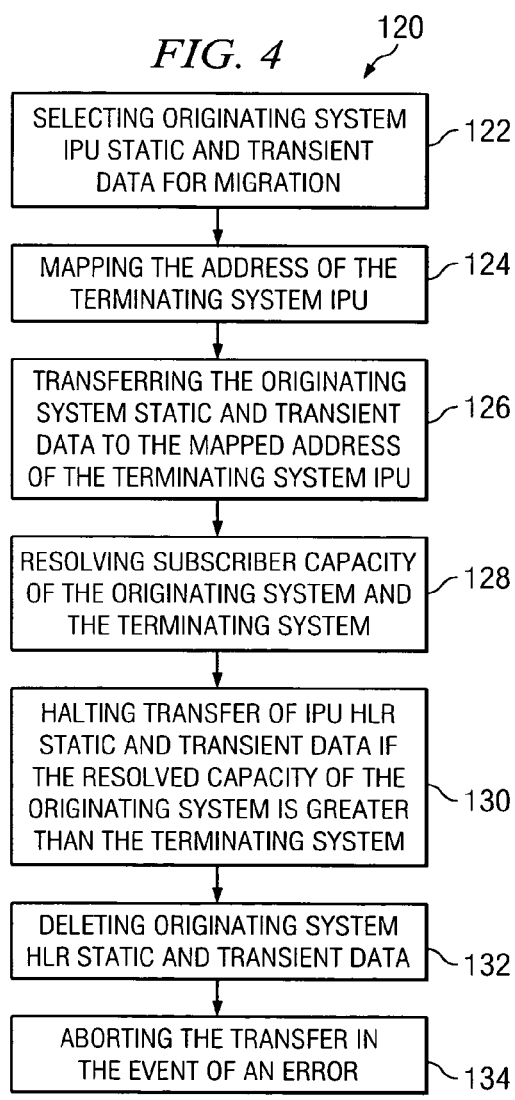

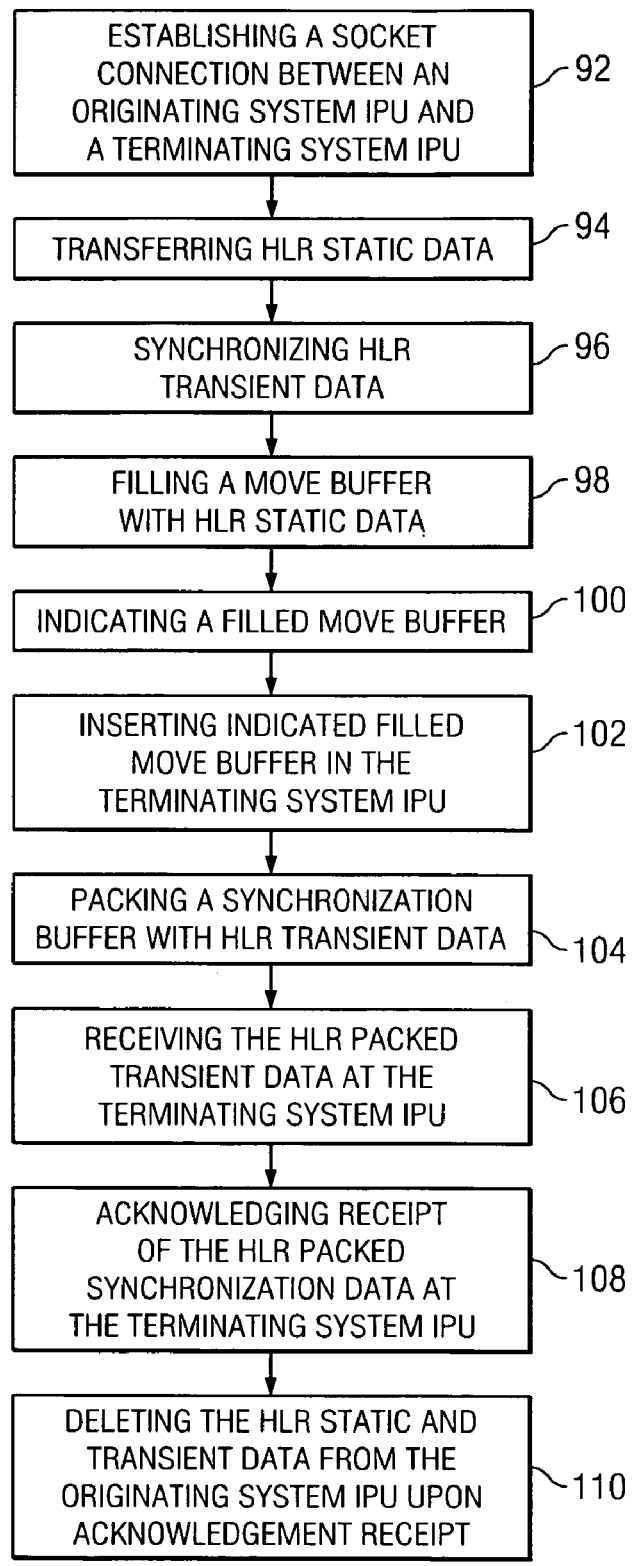

FAST DATABASE MIGRATION

BACKGROUND OF THE INVENTION

The present invention is generally related to enabling transfer of subscriber data from an originating system to a terminating system. The parallel transfer of subscriber data on both the Platform Manager (PM) nodes and Intelligent Processor Unit (IPU) nodes increases the utilization efficiency of Transfer Control Protocol/Internet Protocol (TCP/IP) socket connections. The subscriber data includes Home Location Register (HLR) transient data and static data.

The need to increase existing equipment utilization is a primary concern. By Alcatel's own measurements with a single T1 line connecting the originating and terminating systems, the performance was limited to about 120,000 subscribers per hour (with each subscriber's record consisting of approximately 550 bytes of data). The conclusion was that the existing solution's performance was too slow.

Previously, migration of subscriber data occurred from intelligent processor unit nodes via the Local Area Network (LAN) to the platform manager nodes on the originating system. Then, the originating system would transfer the data to the terminating platform manager nodes. The terminating platform manager nodes would then transfer the data via the LAN to the intelligent processor unit nodes. This serialized approach bottlenecked the transfer process at the platform manager nodes.

Therefore, what is needed is fast database migration which bypasses the platform manager nodes and establishes socket connections directly between intelligent processor unit nodes on the originating system and intelligent processor unit nodes on the terminating system and migrates the static and transient data via the socket connection. This differs from the existing solution in that it is not necessary to transfer data to a platform manager nodes on the originating system, and then over to the platform manager nodes on the terminating system. As a result, the migration takes place in parallel from each intelligent processor unit node on the originating system to each intelligent processor unit node on the terminating system.

SUMMARY OF THE INVENTION

The present invention migrates subscriber's static and transient data from one system (originating system) to another system (terminating system). The intent is to re-balance a system's subscriber capacity by migrating subscribers from the originating system to the terminating system under the assumption that the terminating system has more capacity/bandwidth than the originating system to "home" the subscribers being migrated.

Fast database migration is achieved in the present invention by passing the platform manager nodes and establishing socket connections directly from intelligent processor unit nodes on the originating system to intelligent processor unit nodes on the terminating system and migrate the static and transient data in parallel via the socket connection. This differs from the existing solution in that it is not necessary to transfer data to a platform manager node on the originating system, and then over to the platform manager node on the terminating system. As a result, the migration takes place in parallel from each intelligent processor unit node on the originating system to each intelligent processor unit node on the terminating system.

The present invention establishes socket connections directly from intelligent processor unit nodes on the originating system to intelligent processor unit nodes on the terminating system and migrates the static and transient data via the socket connection. This differs from the existing solution in that it is not necessary to transfer data up to a common platform manager node on the originating system, and then over to the platform manager nodes on the terminating system. As a result, the migration takes place in parallel from each intelligent processor unit node on the originating system to each intelligent processor unit node on the terminating system.

The new solution's performance is much faster than the existing solution. Transferring data over a single T1 line between the originating system and terminating system, transfer rates in excess of 500,000 subscribers per hour are achieved (using the same hardware platform as the existing solution, i.e. SUN FastBox, SUN Netra, and PDSi TS1000).

In one embodiment of the present invention, a method for fast database migration comprises establishing a socket connection directly between intelligent processor unit nodes of the originating system and the terminating system, transferring home location register static data for the subscriber via the socket connection, wherein the home location register static data is transferred in parallel between intelligent processor unit nodes of the originating system and the terminating system and bypassing the platform manager nodes of the originating system and the terminating system and synchronizing home location register transient data between intelligent processor unit nodes of the originating system and the terminating system. The method may also include the steps of specifying the home location register configuration of the terminating system, exchanging route table data between the originating system and the terminating system and mapping the terminating intelligent processor unit address. The method may also include the steps of filling a move buffer with home location register static data, indicating a filled move buffer, inserting the indicated filled move buffer in the intelligent processor unit nodes of the terminating system, packing a synchronization buffer with home location register transient data, receiving the home location register transient data from the packed synchronization buffer by the terminating system, acknowledging receipt of the home location register transient data from the packed synchronization buffer by the terminating system and deleting intelligent processor unit node home location register static data and home location register transient data from the originating system upon acknowledgement receipt.

In a further embodiment of the present invention, a computer readable medium comprises instructions for selecting an originating system intelligent processor unit node home location register static data and home location register transient data for migration, mapping the address of a terminating system intelligent processor unit node and transferring the originating system intelligent processor unit node home location register static data and home location register transient data from the originating system to the mapped address of the terminating system. The computer readable medium may also include resolving subscriber capacity of an originating system and a terminating system, halting transfer of intelligent processor unit node home location register static data and home location register transient data if the resolved capacity of the terminating system is less than the resolved capacity of the originating system, deleting intelligent processor unit node home location register static data and home location register transient data from the originating system and aborting the transfer in the event of an error.

In yet a further embodiment, a system for fast database migration comprises a router adapted to selectively establish a socket connection directly between an originating system intelligent processor unit node to a terminating system intelligent processor unit node. The system may also include a move buffer in communication with the router, a synchronization buffer in communication with the router, an originating system local area network coupled to the originating system intelligent processor unit node and a terminating system local area network coupled to the terminating system intelligent processor unit node.

BRIEF DESCRIPTION OF THE DRAWINGS

FIG. 2 depicts a first method of fast database migration in accordance with a preferred embodiment of the present invention;

FIG. 3 depicts a second method of fast database migration in accordance with a preferred embodiment of the present invention; and FIG. 4 depicts a software flow block of fast database migration in accordance with a preferred embodiment of the present invention.

DETAILED DESCRIPTION OF THE INVENTION

Figure 1:
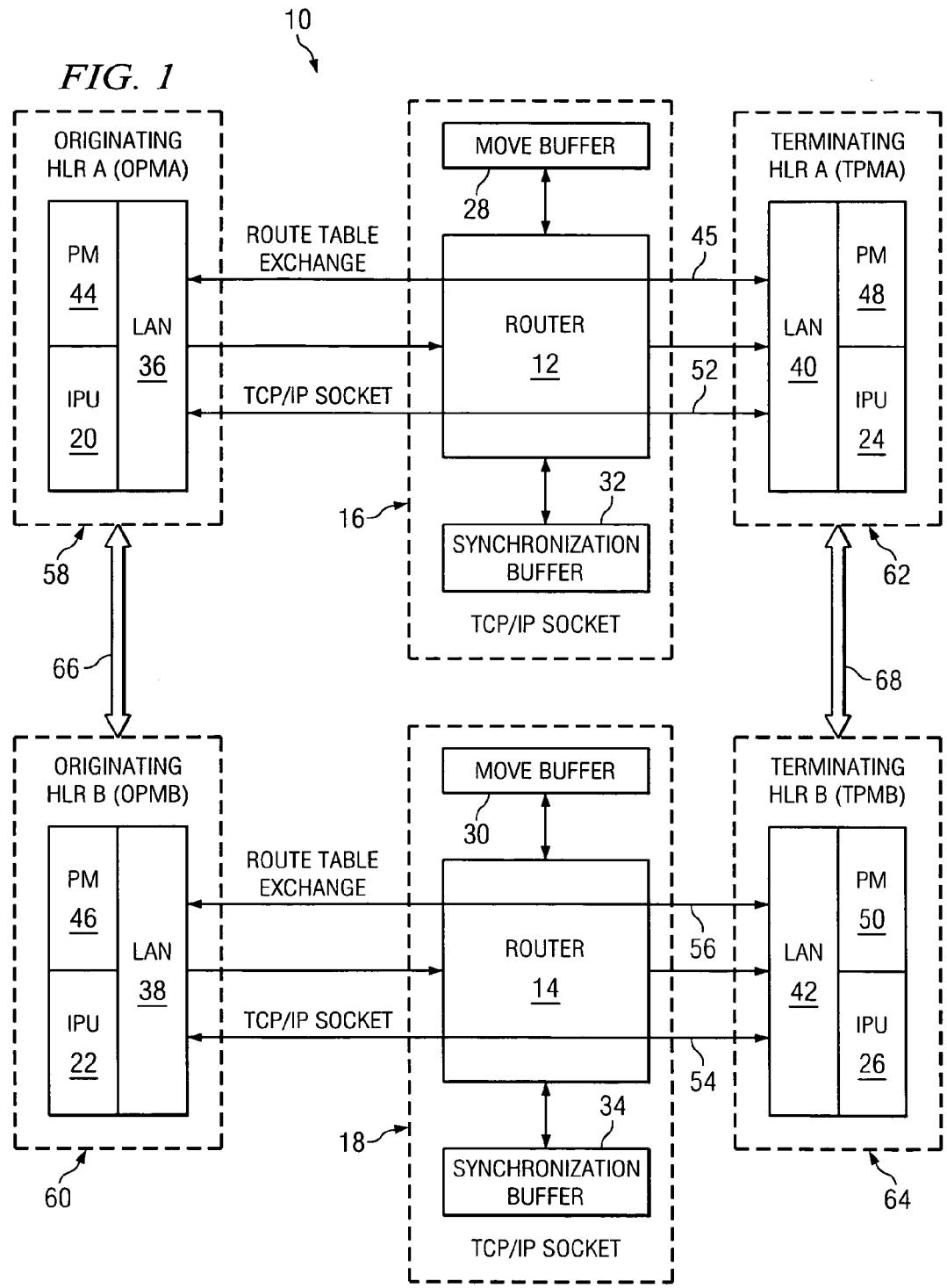
FIG. 1 depicts a system of fast database migration in accordance with a preferred embodiment of the present invention.

Referring now to FIG. 1, a system 10 of fast database migration is depicted. The system has a router 12, 14 adapted to selectively establish a socket connection 16, 18 directly between an originating system intelligent processor unit node 20, 22 to a terminating system intelligent processor unit node 24, 26. The system may also include a move buffer 28, 30 in communication with the router, a synchronization buffer 32, 34 is in communication with the router, an originating system local area network 36, 38 is coupled to the originating system intelligent processor unit node and a terminating system local area network 40, 42 is coupled to the terminating system intelligent processor unit node. Initially communications 66 exist between the originating home location register A 58 and the originating home location register B 60. To increase network utilization the communications 68 may be migrated from the originating location to the terminating location. The terminating home location register A 62 will have uninterrupted communication with terminating home location register B 64. For this migration to occur in a timely manner, the originating intelligent processor units 20, 22 will transfer static and transient data to the terminating intelligent processor units 24, 26 in parallel to the originating platform managers 44, 46 sending data to the terminating platform managers 48, 50. The originating platform managers 44, 46 and the originating intelligent processor units 20, 22 are in communication with originating local area networks 36 and 38. The terminating platform managers 48, 50 and the terminating intelligent processor units 24, 26 are in communication with terminating local area networks 40, 42. The communications between the originating platform managers 44, 46 and the terminating platform managers 48, 50 occur via TCP/IP sockets 52 and 54. The communications between the originating intelligent processor units 20, 22 to the terminating intelligent processor units 24, 26 occur via TCP/IP sockets 16 and 18. This communication between the originating and terminating intelligent processor units is facilitated by routers 12 and 14. These routers are connected to move buffers 28 and 30 which store home location register static data being transferred from the originating system to the terminating system. The routers are also connected to synchronization buffers 32 and 34 which synchronize transient data between the originating and terminating systems. Route tables 45 and 56 are exchanged between the originating and terminating systems. These blocks or modules are software, hardware, firmware, and/or the combination of software, hardware, and/or firmware.

Referring now to FIG. 2, a first method of fast database migration 70 is depicted and comprises a number of blocks or modules that are software, hardware, firmware, and/or the combination of software, hardware, and/or firmware. The method comprises the steps of establishing 72 a socket connection directly between intelligent processor unit nodes of the originating system and the terminating system, transferring 74 home location register static data for the subscriber via the socket connection, wherein the home location register static data is transferred in parallel between intelligent processor unit nodes of the originating system and the terminating system and bypassing the platform manager nodes of the originating system and the terminating system and synchronizing 76 home location register transient data between intelligent processor unit nodes of the originating system and the terminating system. The method may also include the steps of specifying 78 the home location register configuration of the terminating system, exchanging 80 route table data between the originating system and the terminating system and mapping 82 the terminating intelligent processor unit address.

Referring now to FIG. 3, a second method of fast database migration 90 is depicted and comprises a number of blocks or modules that are software, hardware, firmware, and/or the combination of software, hardware, and/or firmware. The method comprises the steps of establishing 92 a socket connection directly between intelligent processor unit nodes of the originating system and the terminating system, transferring 94 home location register static data for the subscriber via the socket connection, wherein the home location register static data is transferred in parallel between intelligent processor unit nodes of the originating system and the terminating system and bypassing the platform manager nodes of the originating system and the terminating system and synchronizing 96 home location register transient data between intelligent processor unit nodes of the originating system and the terminating system. The method may also include the steps of filling 98 a move buffer with home location register static data, indicating 100 a filled move buffer, inserting 102 the indicated filled move buffer in the intelligent processor unit nodes of the terminating system, packing 104 a synchronization buffer with home location register transient data, receiving 106 the home location register transient data from the packed synchronization buffer by the terminating system, acknowledging 108 receipt of the home location register transient data from the packed synchronization buffer by the terminating system and deleting 110 intelligent processor unit node home location register static data and home location register transient data from the originating system upon acknowledgement receipt.

The platform managers and intelligent processor units may be accessed by the cellular phone or the computer with external wireless capability (such as the wireless card) or internal wireless capability (such as 802.11 or any of the other 802 variants), or by the Internet Protocol enabled phone. The communications occurs via at least one of the wireless protocol, the wired protocol and the combination of the wireless protocol and the wired protocol.

Referring now to FIG. 4, a computer readable medium of fast database migration 120 in accordance with a preferred embodiment of the present invention is depicted. This method is preferably embodied in a computer readable medium or software but may also be embodied in firmware and is utilized via hardware. The computer readable media comprises instructions for selecting 122 an originating system intelligent processor unit node home location register static data and home location register transient data for migration, mapping 124 the address of a terminating system intelligent processor unit node and transferring 126 the originating system intelligent processor unit node home location register static data and home location register transient data from the originating system to the mapped address of the terminating system. The computer readable medium may also include resolving 128 subscriber capacity of an originating system and a terminating system, halting 130 transfer of intelligent processor unit node home location register static data and home location register transient data if the resolved capacity of the terminating system is less than the resolved capacity of the originating system, deleting 132 intelligent processor unit node home location register static data and home location register transient data from the originating system and aborting 134 the transfer in the event of an error.

The transfer of data between the originating and terminating LANs occurs via at least one of a wireless protocol, a wired protocol and/or the combination of the wireless protocol and the wired protocol. The steps performed in this figure are performed by software, hardware, firmware, and/or the combination of software, hardware, and/or firmware.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the platform managers, intelligent processor units, router, move buffers, synchronization buffers, TCP/IP sockets and route tables. Also, these capabilities may be performed in the current manner or in a distributed manner and on, or via, any device able to provide and/or receive broadband signals. Further, although depicted in a particular manner, various modules or blocks may be repositioned without departing from the scope of the current invention. For example, the functionality performed by LAN and router may be self contained. Still further, although depicted in a particular manner, a greater or lesser number platform managers, intelligent processor units, routers, move buffers, synchronization buffers, TCP/IP sockets and route tables can be utilized with the present invention in order to accomplish the present invention, to provide additional known features to the present invention, and/or to make the present invention more efficient.

What is claimed is:

1. A method for migrating a subscriber from an originating system to a terminating system, comprising the steps of:
   establishing a socket connection directly between intelligent processor unit nodes of the originating system and intelligent processor unit nodes of the terminating system;
   transferring home location register static data and home location register transient data for the subscriber via the socket connection, wherein the home location register static data and home location register transient data are transferred in parallel between the intelligent processor unit nodes of the originating system and the intelligent processor unit nodes of the terminating system, and bypassing the platform manager nodes of the originating system and the platform manager nodes of the terminating system during the parallel transferring of the home location register static data and the home location register transient data, the transferring comprising:
   filling a move buffer with home location register static data,
   indicating a filled move buffer,
   inserting the indicated filled move buffer in the intelligent processor unit nodes of the terminating system,
   packing a synchronization buffer with home location register transient data,
   receiving the home location register transient data from the packed synchronization buffer by the terminating system; and
   synchronizing the home location register transient data between the intelligent processor unit nodes of the originating system and the intelligent processor unit nodes of the terminating system.

2. The method of claim 1 comprising the step of: specifying the home location register configuration of the terminating system.

3. The method of claim 1 comprising the step of: exchanging route table data between the originating system and the terminating system.

4. The method of claim 1 comprising the step of: mapping the terminating intelligent processor unit address.

5. The method of claim 1 comprising the step of: acknowledging receipt of the home location register transient data from the packed synchronization buffer by the terminating system.

6. The method of claim 5 comprising the step of: deleting intelligent processor unit node home location register static data and home location register transient data from the originating system upon acknowledgement receipt.

7. A non-transitory computer readable medium comprising instructions executable by at least one processor of a router provided on a direct connection between an intelligent processor unit of an originating system home location register and an intelligent processor unit of a terminating system home location register, the instructions, when executed, causing the at least one processor to perform:
   selecting originating system intelligent processor unit node home location register static data and home location register transient data for migration;
   mapping the address of a plurality of terminating systems; and
   transferring the originating system home location register static data and the originating system home location register transient data in parallel from the originating system to each of a plurality of intelligent processor unit nodes of a mapped address of the plurality of corresponding terminating systems, and bypass a platform manager node of the originating system and the platform manager node of the terminating system during the transfer of the home location register static data and the home location register transient data, the transferring comprising the at least one processor being further configured to perform:
   filling a move buffer of the router with the home location register static data,
   indicating a filled move buffer,
   inserting the indicated filled move buffer in the intelligent processor unit nodes of the terminating system,
   packing a synchronization buffer with home location register transient data,
   receiving the home location register transient data from the packed synchronization buffer by the terminating system.

8. The non-transitory computer readable medium of claim 7 comprising instructions for: resolving subscriber capacity of an originating system and a terminating system.

9. The non-transitory computer readable medium of claim 8 comprising instructions for: halting transfer of intelligent processor unit node home location register static data and home location register transient data if the resolved capacity of the terminating system is less than the resolved capacity of the originating system.

10. The non-transitory computer readable medium of claim 9 comprising instructions for: deleting intelligent processor unit node home location register static data and home location register transient data from the originating system.

11. The non-transitory computer readable medium of claim 7 comprising instructions for: aborting the transfer in the event of an error.

12. A system for fast database migration, comprising:
a router;
a move buffer in communication with the router;
a synchronization buffer in communication with the router;
the router configured to:
selectively establish a socket connection directly between a plurality of originating system intelligent processor unit nodes and a corresponding plurality of first terminating system intelligent processor unit nodes, wherein the socket connection provides uninterrupted communication between the plurality of originating system intelligent processor unit nodes and the corresponding plurality of first terminating system intelligent processor unit nodes;
transfer home location register static data and home location register transient data from the subscriber via the socket connection, wherein the home location register static data and home location register transient data are transferred in parallel between the plurality of originating system intelligent processor unit nodes and the corresponding plurality of first terminating system intelligent processor unit nodes; and
bypass, via the socket connection a platform manager node of the originating system and a platform manager node of the terminating system;
the transferring comprising:
filling the move buffer with home location register static data,
indicating a filled move buffer,
inserting the indicated filled move buffer in the intelligent processor unit nodes of the terminating system,
packing the synchronization buffer with home location register transient data,
receiving the home location register transient data from the packed synchronization buffer by the terminating system.

13. The system of claim 12 comprising: an originating system local area network coupled to the originating system intelligent processor unit node; and a terminating system local area network coupled to the terminating system intelligent processor unit node.

* * * * *